(12) United States Patent
Diepstraten et al.

(10) Patent No.: US 7,463,589 B2
(45) Date of Patent: Dec. 9, 2008

(54) WIRELESS LAN WITH ENHANCED CARRIER SENSING

(75) Inventors: Wilhelmus Diepstraten, Noord-Brabant (NL); Adriaan Kamerman, Utrecht (NL); Kai Roland Kriedte, Wijk bij Duurstede (NL); D. J. Richard Van Nee, De Meern (NL)

(73) Assignee: Agere Systems Inc., Allentown, PA (US)

( * ) Notice: Subject to any disclaimer, the term of this patent is extended or adjusted under 35 U.S.C. 154(b) by 1217 days.

(21) Appl. No.: 09/919,051

(22) Filed: Jul. 31, 2001

(65) Prior Publication Data

US 2003/0026198 A1 Feb. 6, 2003

(30) Foreign Application Priority Data

Jul. 31, 2000 (EP) ................................. 00306496

(51) Int. Cl.
 H04J 1/16 (2006.01)
 H04J 3/14 (2006.01)
 H04J 1/00 (2006.01)
 H04L 12/26 (2006.01)

(52) U.S. Cl. ...................................... 370/241; 370/343
(58) Field of Classification Search ................. 370/310, 370/315, 328, 338, 431, 445, 447, 203, 343, 370/474, 480, 503, 241; 375/340, 343, 354
See application file for complete search history.

(56) References Cited

U.S. PATENT DOCUMENTS 5,815,488 A * 9/1998 Williams et al. ............ 370/206

| 2001/0024454 | A1 * | 9/2001 | Hasegawa et al. | 370/503 |
|---|---|---|---|---|
| 2001/0033579 | A1 * | 10/2001 | Nelson et al. | 370/447 |
| 2001/0055311 | A1 * | 12/2001 | Trachewsky et al. | 370/445 |
| 2007/0135865 | A1 * | 6/2007 | Schmitt et al. | 607/59 |

FOREIGN PATENT DOCUMENTS

| EP | 901 252 A | 3/1999 |
|---|---|---|
| EP | 0 901 252 A2 | 10/1999 |
| WO | 98 10568 A | 3/1998 |
| WO | WO 98/10568 | 12/1998 |

OTHER PUBLICATIONS

European Search Report, Jan. 18, 2001.
Carl Andrew et al.: "CCK Modulation delivers 11 Mbps for high rate IEEE 802.11 Extension"—Harris Semiconductors, Mar. 14, 2000, pp. 1-8, XP002147321, p. 1, line 1—p. 3, line 16.
Andren et al., "CCK Modulation Delivers 11 Mbps for High Rate IEEE 802.11 Extension," Harris Semiconductors, XP002147321, pp. 1-8 (Mar. 14, 2000).

* cited by examiner

Primary Examiner—Kevin C Harper

(57) ABSTRACT

Medium access control device (301) for a mobile network station (3, 4, 5) or an access point (AP1) in a wireless local area network (1), having controlling means (302), processing means (303) and transmitting and receiving means (304); the controlling means (302) being arranged to control transmission and reception of radio frequency data signals containing data symbols; the transmitting and receiving means (304) being arranged for transmission and reception of electromagnetic data signals; the processing means (303) being arranged for detecting a first signal portion and a second signal portion in the received data signal, the second signal portion following the first signal portion and having a signal coding differing from a signal coding of the first signal portion.

8 Claims, 5 Drawing Sheets

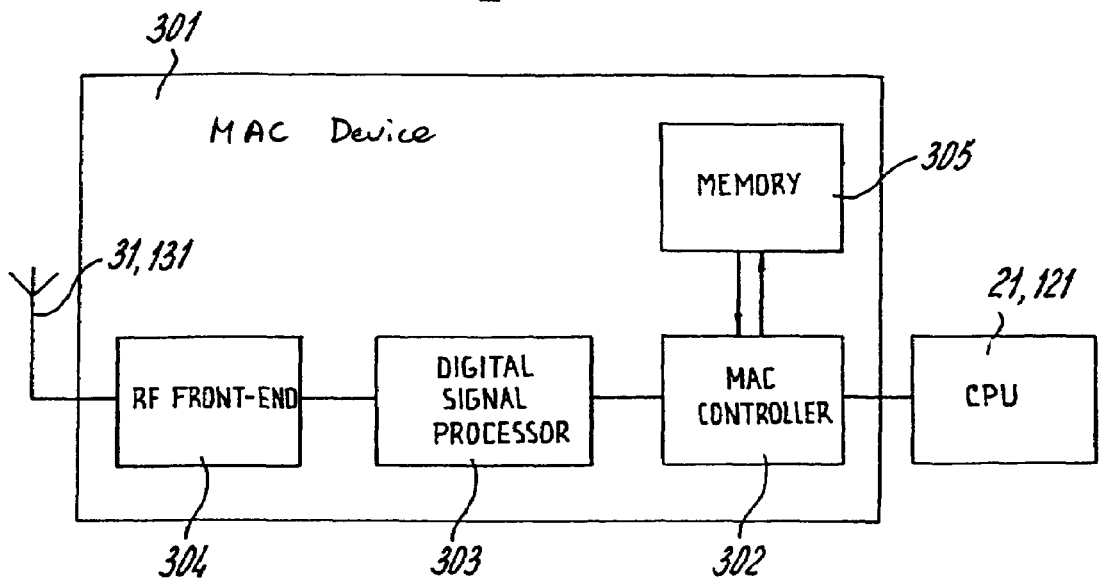
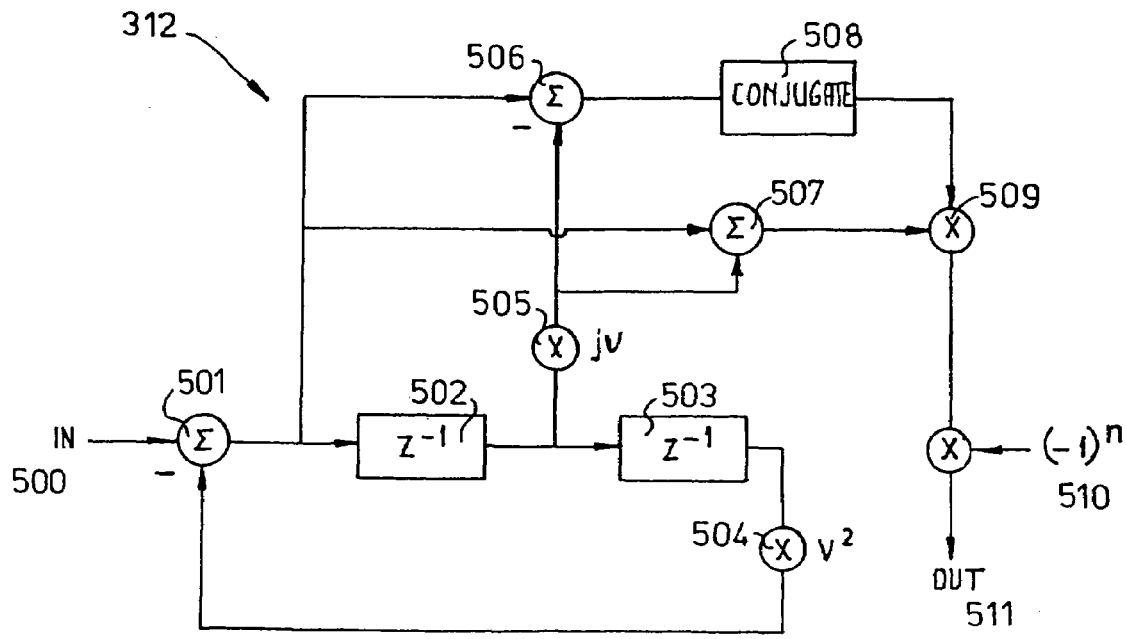

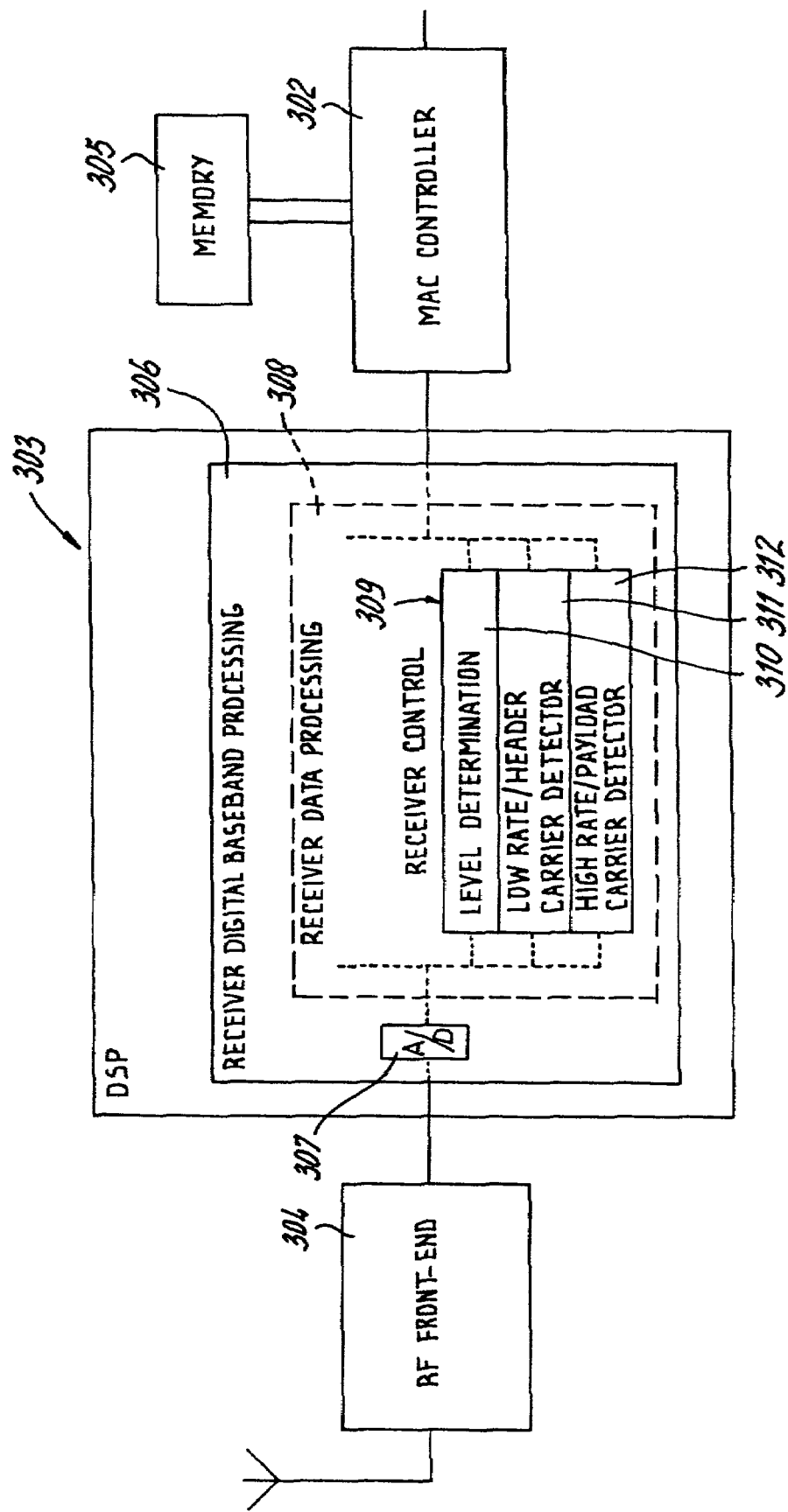

WIRELESS LAN WITH ENHANCED CARRIER SENSING

FIELD OF THE INVENTION

The present invention relates to a medium access control device for a mobile network station or an access point in a wireless local area network as defined in the outset of claim 1.

PRIOR ART

In a wireless local area network (LAN) for data-communication a plurality of (mobile) network stations (e.g., personal computers, telecommunication devices, etc.) are present that are capable of wireless communication. As compared to wired LANs, data-communication in a wireless LAN can be more versatile, due to the flexibility of the arrangement of network stations in the area covered by the LAN, and due to the absence of cabling connections.

Wireless LANs are generally implemented according to the standard as defined by the ISO/IEC 8802-11 international standard (IEEE 802.11). IEEE 802.11 describes a standard for wireless LAN systems that will operate in the 2.4-2.5 GHz ISM (industrial, scientific and medical) band. This ISM band is available worldwide and allows unlicensed operation for spread spectrum systems. For both the U.S. and Europe, the 2,400-2,483.5 MHz band has been allocated, while for some other countries, such as Japan, another part of the 2.4-2.5 GHz ISM band has been assigned. The IEEE 802.11 standard focuses on the MAC (medium access control) and PHY (physical layer) protocols for access point based networks and ad-hoc networks.

In wireless networks based on access points, the stations within a group or cell can communicate only directly to the access point. This access point forwards messages to the destination station within the same cell or through the wired distribution system to another access point, from which such messages arrive finally at the destination station. In ad-hoc networks, the stations operate on a peer-to-peer level and there is no access point or (wired) distribution system.

The 802.11 standard supports three PHY protocols: DSSS (direct sequence spread spectrum), FHSS (frequency hopping spread spectrum), and infrared with PPM (pulse position modulation). All these three PHYs all provide bit rates of 1 and 2 Mbit/s.

Furthermore, IEEE 802.11 includes extensions 11a and 11b which allow for additional higher bit rates: extension 11b is for a high bit rate CCK (Complementary Code Keying) PHY, and provides bit rates of 5.5 and 11 Mbit/s as well as the basic DSSS bit rates of 1 and 2 Mbit/s within the same 2.4-2.5 GHz ISM band. Extension 11a provides a high bit rate OFDM (Orthogonal Frequency Division Multiplexing modulation) PHY standard providing bit rates in the range of 6 to 54 Mbit/s in the 5 GHz band.

The IEEE 802.11 basic MAC protocol allows interoperability between compatible PHYs through the use of the CSMA/CA (carrier sense multiple access with collision avoidance) protocol and a random back-off time following a busy medium condition. All directed traffic uses immediate positive acknowledgement (ACK frame), with the sender scheduling a retransmission if no ACK is received. The IEEE 802.11 CSMA/CA protocol is designed to reduce the collision probability between multiple stations accessing the medium at the same time, which is most likely to occur just after the medium becomes free. Therefore, a random back-off arrangement is used to resolve medium contention conflicts. In addition, the IEEE 802.11 MAC protocol defines special functional behaviour for fragmentation of packets, medium reservation via RTS/CTS (request-to-send/clear-to-send) polling interaction and point co-ordination (for time-bounded services).

Moreover, the IEEE 802.11 MAC protocol defines Beacon frames sent at regular intervals by the access point to allow stations to monitor the presence of the access point. The IEEE 802.11 MAC protocol also provides a set of management frames to allow a network station to scan for other access points on any channel available.

In prior art wireless LANs with PHYs providing standard low bit rates of 1 and 2 Mbit/s, transmissions comprise preamble and payload data frames. The preamble contains data related to network traffic management functions. The payload data frame contains the actual data.

In the 2.4 GHz band, the preamble data are transmitted at 1 Mbit/s, while payload data can be transmitted at 1 and 2 Mbit/s. In the standard IEEE 802.11 DSSS PHY, symbols transmitted in a data frame (preamble and payload) are coded using the 11-chip Barker Sequence (+1, −1, +1, +1, −1, +1, +1, +1, −1, −1, −1) in BPSK (Binary Phase Shift Keying) modulation. Carrier sensing in prior art is based on the detection of Barker Sequence modulated symbols and the received signal level. In the preamble the carrier sensing procedure also allows training of the receiver, during which procedure automatic gain control, correlation of the incoming signal with the known training pattern, and comparison of the signal strength with predetermined threshold levels are performed. U.S. Pat. No. 5,131,006 discloses an arrangement and method for reliable carrier detection processing of IEEE 802.11 DSSS signals.

The IEEE 802.11 extension 11b specifies that a preamble is transmitted at 1 Mbit/s (with the option for short training, the last part of the preamble can be transmitted at 2 Mbit/s), while the payload is transmitted at the high rate of 5.5 or 11 Mbit/s. However, the payload transmission of extension 11b uses a modulation technique different from the preamble transmission, to enhance the robustness of the high rate payload transmission. In the 2.4 GHz band the high bit rate payload transmission signals are modulated by QPSK (Quadrature Phase Shift Keying) in which a signal representing a symbol, comprises I (in-phase) and Q (quadrature) signal components. Using CCK, 256 of such symbols are defined.

The IEEE 802.11 extension 11a (in the 5 GHz band) uses a different modulation technique OFDM, with transmission rates of 6 to 54 Mbit/s. The high bit rate payload data stream is split over a number of lower rate data streams, transmitted simultaneously by a number of subcarrier signals. Here, symbols are defined (coded) by the particular subcarriers superposed in the signal. In extension 11a, the preamble signal structure also differs from the payload signal structure.

Due to the differences between the preamble and the payload transmission, carrier detector circuits as known from prior art may not detect the payload signals as provided by extensions 11a and 11b in the right way.

Moreover, the IEEE 802.11 extensions do not specify any carrier sensing detection protocol for carrier detection in payload transmission. To detect a high bit rate carrier signal in the 2.4 GHz band a general purpose QPSK filter could be applied. From IEEE Trans. Comm. COM-26, 5 (1978) pp. 517-522, such a general purpose QPSK filter is known, but the computational requirements of this filter render it too slow for the purpose of carrier detection in wireless LANs. For the detection of carrier signals in payload transmission in the 5 GHz band no devices are known from the prior art.

The lack of high bit rate carrier detection of payload data negatively interferes with the IEEE 802.11 CSMA/CA protocol to minimise data frame collisions between two or more transmitting network stations, or between network stations and an access point (base station). Disadvantageously, as an example, a network station using the carrier sensing method from prior art can not check whether a payload transmission from another station is in progress, unless the former station detected the low bit rate preamble sent by the latter, which contains the data header information including the expected transmission time of the payload. If a network station is not aware of this information and a high bit rate payload transmission from another station is in progress, the network station will mistakenly assume the medium is free for transmission, completely in accordance with the IEEE 802.11 MAC "listen before talk" scheme, since no low bit rate signal is detected. Subsequently, the station will initiate a transmission by sending a preamble, which may disturb the payload transmission in progress and cause a collision. Also, it is possible that no acknowledgement (ACK frame) is returned by the access point which, at that instant, is receiving the high bit rate payload transmission from the other station, in which case the network station may attempt a retransmission even while the payload transmission from the other network station is still going on. Similarly, that other station that was already transmitting the high bit rate payload data, may have to retransmit due to the collision, but this station may also be unaware of other stations attempting to transmit, since the station can not detect on-going transmissions from other stations (both preamble and payload data) while executing a transmission. Within a network, this results in an overall high probability of failure at recovery from collisions. Also, a similar process can take place between stations in neighbouring network cells which use the same frequency channel, where a network station in one cell does not notice a transmission from a station in the neighbouring network cell.

It is an object of the present invention to provide an arrangement and a method for reliable carrier sensing at both low and high bit rate transmissions in wireless LANs.

SUMMARY OF THE INVENTION

The present invention relates to a medium access control device for a mobile network station or an access point in a wireless local area network, comprising controlling means, processing means and transmitting and receiving means; said controlling means being arranged to control transmission and reception of radio frequency data signals containing data symbols; said transmitting and receiving means being arranged for transmission and reception of electromagnetic data signals; said processing means being arranged for detecting a first signal portion in a received data signal, characterized in that said processing means are also arranged for detecting a second signal portion in said received data signal, wherein said second signal portion follows after said first signal portion, and said second signal portion comprises a second electromagnetic signal coding different from a first electromagnetic signal coding of said first signal portion.

Such arrangement and method will allow a better network cell planning and a higher data throughput in network cell and LAN by reducing the probability of failure at recovery from collisions.

Also, the present invention relates to a medium access control device as defined above, characterized in that said first signal portion comprises BPSK, QPSK or other PSK as said first electromagnetic signal coding and said second signal portion comprises CCK, QAM or PSK as said second electromagnetic signal coding.

Moreover, the present invention relates to a medium access control device as defined above, characterized in that said processing means, in order to detect a carrier signal in said second signal portion, comprises a complex-valued processing filter of two IR filters with biquad structure, capable of sampling said second signal portion at a sampling frequency which is twice the frequency of said second signal portion.

Furthermore, the present invention relates to a medium access control device as defined above, characterized in that said first signal portion comprises OFDM as said electromagnetic first signal coding and said second signal portion comprises OFDM as said electromagnetic second signal coding.

Also, the present invention relates to a medium access control device as defined above, characterized in that said processing means, in order to detect said carrier signal in said second signal portion, is arranged for sampling a first part of said second signal portion with a first duration, a following second part of said second signal portion with a second duration and a final third part of said second signal portion with a third duration from said second received data signal, wherein said first duration equals said third duration, and the duration of the sum of said first, second, and third duration equals a complete data symbol duration;

and said processing means, in order to detect said carrier signal in said second signal portion, is further arranged for determining an auto-correlation between said first part of said second signal portion and said third part of said second signal portion.

The present invention further relates to a mobile network station provided with a medium access control device as defined above.

Also, the present invention relates to an access point provided with a medium access control device as defined above.

The present invention further relates to a wireless network comprising at least one access point as defined above, and at least one mobile network station as defined above, characterized in that in said network, said at least one access point and said at least one mobile network station are being arranged for communicating data signals with each other.

The present invention also relates to a method to be carried out by a medium access control device for a mobile network station or an access point in a wireless local area network, said medium access control device comprising controlling means, processing means and transmitting and receiving means; said controlling means being arranged to control transmission and reception of radio frequency data signals containing data symbols; said transmitting and receiving means being arranged for transmission and reception of electromagnetic data signals; said method comprising at least the following step:

to detect a first signal portion in a received data signal, characterized by the following step:

to detect a second signal portion in said received data signal, wherein said second signal portion follows after said first signal portion, and said second signal portion comprises a second electromagnetic signal coding different from a first electromagnetic signal coding of said first signal portion.

The present invention also relates to a computer program product to be loaded by a medium access control device for a mobile network station or an access point in a wireless local area network, said medium access control device comprising controlling means, processing means and transmitting and receiving means; said controlling means being arranged to control transmission and reception of radio frequency data signals containing data symbols; said transmitting and receiving means being arranged for transmission and reception of electromagnetic data signals; said computer program product, after being loaded, providing said medium access control device with the capacity to carry out at least the following step:
  to detect a first signal portion in a said received data signal, characterized by the following step:
  to detect a second signal portion in said received data signal, wherein said second signal portion follows after said first signal portion, and said second signal portion comprises a second electromagnetic signal coding different from a first electromagnetic signal coding of said first signal portion.

Furthermore, the present invention relates to a data carrier provided with a computer program product as defined above.

BRIEF DESCRIPTION OF THE DRAWINGS

Below, the invention will be explained with reference to some drawings, which are intended for illustration purposes only and not to limit the scope of protection as defined in the accompanying claims.

FIG. 3 shows a schematic example of a wireless LAN interface for medium access controller devices as described in this invention for use in a network station or an access point;

FIG. 4 shows a schematic block diagram of an carrier sensing detector arrangement in a medium access controller device as described in this invention for use in a network station or an access point;

FIG. 5 shows schematically an implementation of a carrier sensing detector for high bit rate payload transmission detection in the 2.4 GHz band, according to the present invention;

DESCRIPTION OF PREFERRED EMBODIMENTS

Figure 1:
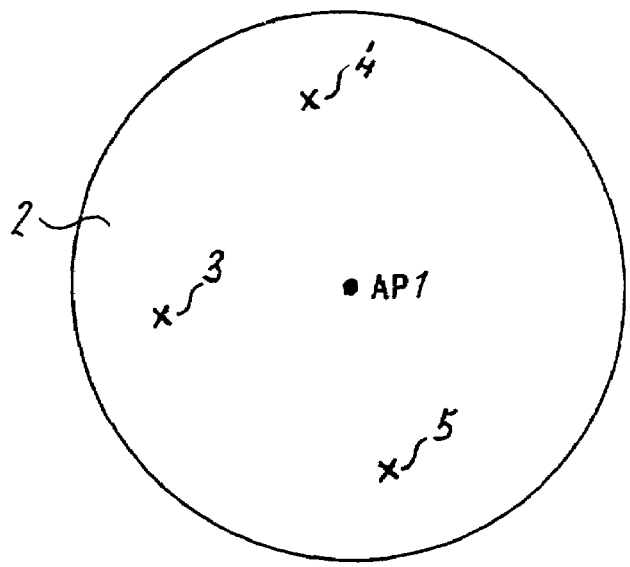
FIG. 1 shows schematically a network cell in a wireless LAN comprising an access point and a plurality of network stations.

FIG. 1 shows a schematic overview of a wireless LAN 1 in which the invention is implemented. The wireless LAN 1 includes a number of network cells of which one cell 2 is schematically depicted by a circle around its respective access point AP1. The access point AP1 serves as access point for the cell 2. The LAN 1 may include several, possibly partly overlapping cells. In the cell 2, a plurality of network stations 3, 4, 5 is present of which three are shown. Access point AP1 is connected via suitable I/O means to a wired distribution network for communication with other access points (cf. FIG. 2b). In LAN 1 the actual number of network stations 3, 4, 5 may be 0 (zero) or more. The network stations 3, 4, 5 may be mobile or at fixed positions: they all connect to the network 1 by means of wireless data-communication. In this embodiment of the invention the network stations 3, 4, 5 are represented by personal computers, but it is to be understood that the network stations may be any type of telecommunication equipment that uses a wireless data-communication network, such as mobile telephones, pagers, PDAs (personal digital assistants), laptop computers, etc.

The cell 2 has a size as depicted by the size of the circle. The cell size is determined by the requirements of data throughput in the cell and can be controlled by suitable setting of the levels of the defer behaviour threshold and carrier sense detection threshold (for a cell including all its associated stations or, for stations individually) as known from EP-A-0903891. For example, cell 2 may comprise a number of network stations that require high throughputs. In that case, the cell size should be small such that other network stations will be left out of the cell as much as possible. In another case, for example, in a cell 2 only network stations with low throughput requirements will be present. Then, a single large cell 2 comprising these network stations will be sufficient to handle all data traffic related to that cell 2.

Figure 2A:
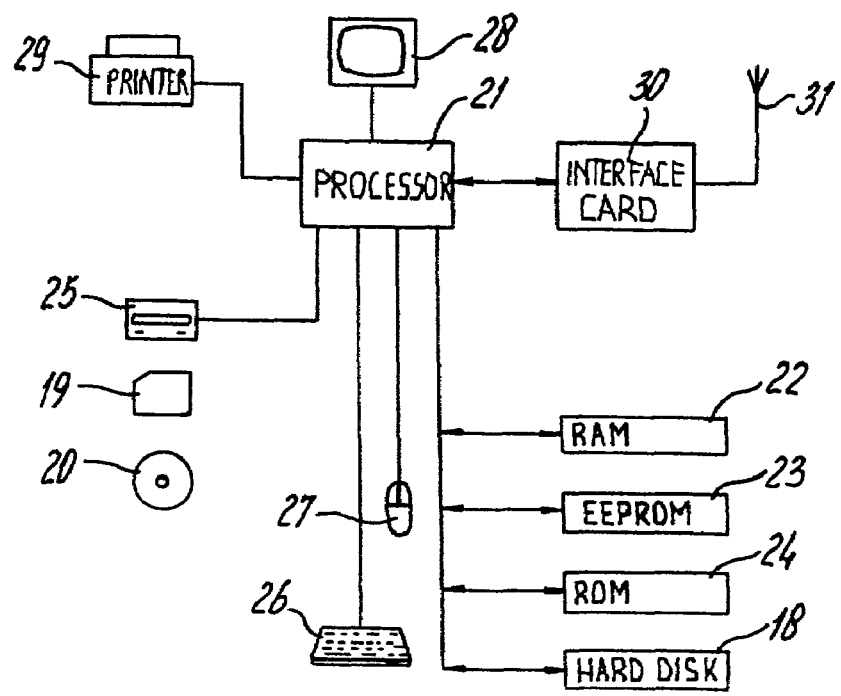
FIG. 2a shows a schematic block diagram of an example of a network station in the present invention.

FIG. 2a shows a schematic block diagram of an embodiment of a network station 3, 4, 5 comprising host processor means 21 with peripherals. The host processor means 21 is connected to memory units 18, 22, 23, 24 which store instructions and data, one or more reading units 25 (to read, e.g., floppy disks 19, CD ROM's 20, DVD's, etc.), a keyboard 26 and a mouse 27 as input devices, and as output devices, a monitor 28 and a printer 29. Other input devices, like a trackball and a touch screen, and output devices may be provided for. For data-communication over the wireless LAN 1, an interface card 30 is provided. The interface card 30 connects to an antenna 31.

The memory units shown comprise RAM 22, (E)EPROM 23, ROM 24 and hard disk 18. However, it should be understood that there may be provided more and/or other memory units known to persons skilled in the art. Moreover, one or more of them may be physically located remote from the processor means 21, if required. The processor means 21 are shown as one box, however, they may comprise several processing units functioning in parallel or controlled by one main processor, that may be located remote from one another, as is known to persons skilled in the art.

In an alternative embodiment of the present invention, the network station 3, 4, 5 may be a telecommunication device in which the components of interface card 30 are incorporated as known to those skilled in the art.

Figure 2B:
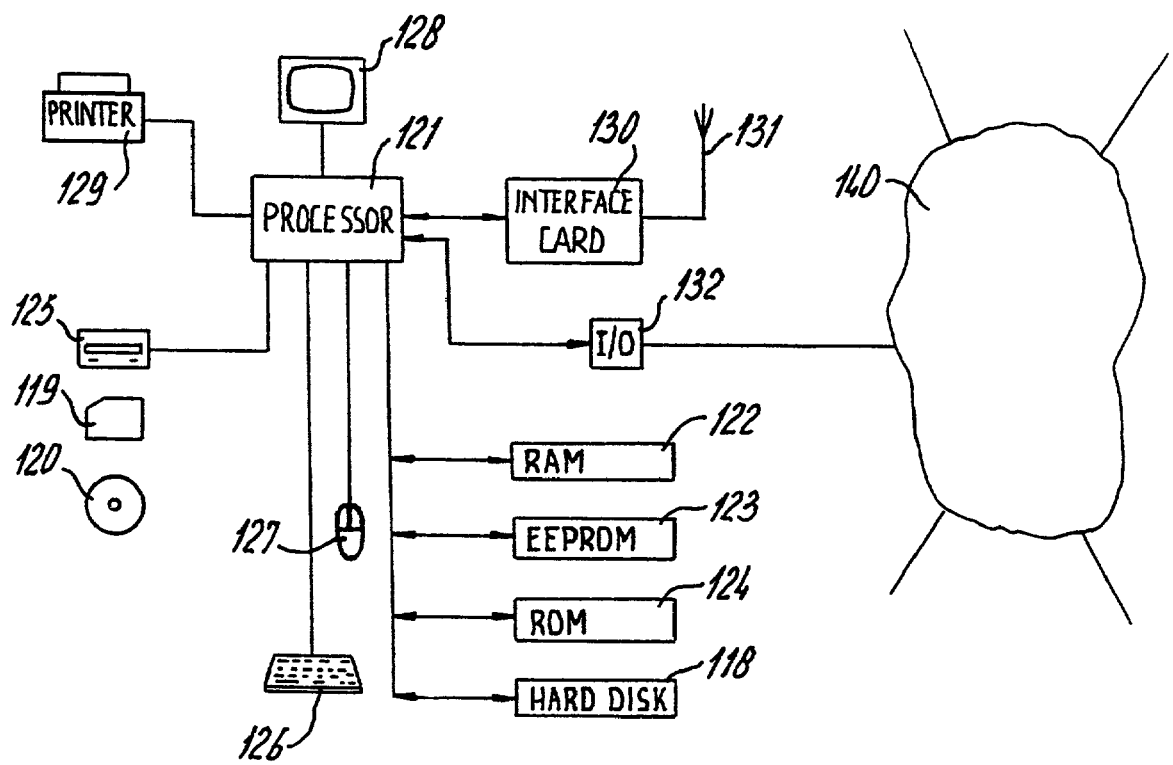
FIG. 2b shows a schematic block diagram of an example of an access point of the present invention.

FIG. 2b shows a schematic block diagram of an embodiment of an access point AP1 comprising host processor means 121 with peripherals. The host processor means 121 is connected to memory units 118, 122, 123, 124 which store instructions and data, one or more reading units 125 (to read, e.g., floppy disks 119, CD ROM's 120, DVD's, etc.), a keyboard 126 and a mouse 127 as input devices, and as output devices, a monitor 128 and a printer 129. For data-communication over the wireless LAN 1, an interface card 130 is provided. The interface card 130 connects to an antenna 131. Furthermore, the access point AP1 is connected to a wired distribution network 140 through I/O means 132 for communication with other access points.

The memory units shown comprise RAM 122, (E)EPROM 123, ROM 124 and hard disk 118. However, it should be understood that there may be provided more and/or other memory units known to persons skilled in the art. Moreover, one or more of them may be physically located remote from the processor means 121, if required. The processor means 121 are shown as one box, however, they may comprise several processing units functioning in parallel or controlled by one main processor, that may be located remote from one another, as is known to persons skilled in the art. Moreover, other input/output devices than those shown (i.e., 126, 127, 128, 129) may be provided.

In an alternative embodiment of the present invention, the access point AP1 may be a telecommunication device in which the components of interface card 130 are incorporated as known to those skilled in the art.

FIG. 3 shows a block diagram of the arrangement of the present invention for a medium access controller (MAC) device 301 on a wireless LAN interface card 30 installed in a network station 3, 4, 5 or on a similar wireless LAN interface card 130 installed in an access point AP1, respectively. In this embodiment the MAC device 301 relates to a carrier sensing detector for the IEEE 802.11 extension 11b for high bit rate payload transmissions in the 2.4 GHz band.

In a wireless LAN device (i.e. network station 3, 4, 5, or access point AP1) the MAC device 301 comprises a MAC controller chip 302, a digital signal processor DSP 303, and a front-end RF (Radio Frequency) communication device 304. The MAC controller chip 302 is connected through a bus interface to the host processor means 21, 121. Further, the MAC controller 302 interfaces to the DSP 303 (digital signal processor) which is connected to the front-end RF (Radio Frequency) communication device 304. The front-end RF communication device 304 connects to the antenna 31, 131. The MAC device 301 may comprise an on-board memory 305 interfaced to the controller chip 302. Alternatively, the components 302, 303, 304, 305 which are shown, may be separate devices or integrated into one device. As desired, the devices also may be implemented in the form of analog or digital circuits. The on-board memory 305 may comprise RAM, ROM, FlashROM and/or other types of memory devices, as are known in the art.

The DSP 303 performs modulation and demodulation and handles control signals between the MAC controller 302 and RF (Radio Frequency). Between MAC controller 302 and DSP 303 I/O data are exchanged (e.g., data to transmit, data received, clock signal, control signal). The DSP 303 is connected to the RF front-end communication device 304 through signal lines for the transmission and reception of the I (in-phase) and Q (quadrature) signal components of the QPSK modulated CCK symbols. The RF front-end communication device 304 is normally operating in reception mode, taking care of gain steps (including automatic gain control), down conversion from RF frequency to baseband signal, preferably, by means of conversion to an IF frequency (Inter Frequency) and filter stages. In the transmission state, the RF front-end communication device 304 handles filtering, up-conversion (preferably, by an IF frequency step) and amplification of signals.

In an alternative embodiment, the DSP 303 is connected to an RF front-end communication device 304, which is arranged for transmission and reception of payload symbols that are modulated by another modulation technique, e.g., QAM (Quadrature Amplitude Modulation) or PSK (Phase Shift Keying), other than BPSK and QPSK.

FIG. 4 shows the block diagram of FIG. 3, with the receiver digital baseband processing functions in the DSP 303 displayed in more detail. The receiver digital baseband processing function block 306 comprises analog-digital conversion blocks 307 (i.e., one converter for the I (in-phase) component and one converter for the Q (quadrature) component), receiver data processing 308 (where the demodulation/detection takes place), and a receiver control device 309. This receiver control device 309 contains functional blocks for level determination 310, a low bit rate header carrier sensing detector 311, and a high bit rate payload carrier sensing detector 312, according to the embodiment of the present invention for high bit rate carrier detection in the 2.4 GHz band.

Upon reception of a signal, the receiver control device 309 will process this signal to determine its power level and its sort (i.e., preamble or payload). Subsequently, the receiver control device 309 will send a reporting signal to the MAC controller 302 that a carrier signal was detected to indicate that the medium is not free for transmission. If a high bit rate payload carrier signal is detected, the MAC controller 302 should defer from starting a transmission in order to avoid collision with the transmission in progress. If the transmission was addressed to the LAN station of that particular MAC controller, signals should be processed as required. As in prior art, detection of a carrier of a low bit rate transmission (either preamble or payload) will initiate the known IEEE 802.11 CSMA/CA protocol in the MAC controller 302 to process signals accordingly.

In FIG. 5 a schematic implementation of a carrier sensing detector 312 for high bit rate payload transmission is shown, according to the embodiment of the present invention for high bit rate carrier detection in the 2.4 GHz band. The detector 312 is based on a complex-valued processing filter.

The detector 312 comprises an input 500, an output 511, summation units 501, 506, 507, signal delay units 502, 503, multiplication units 504, 505, 509, 510, and a conjugation unit 508.

In the detector 312, the input 500 is connected to the first summation unit 501, which connects to the second and the third summation unit 506, and 507, respectively, and to the first delay unit 502. The first delay unit 502 connects to the first multiplication unit 505 and to the second delay unit 503. The second delay unit 503 connects to the second multiplication unit 504, which connects again to the first summation unit 501. The first multiplication unit 505 is connected to the second summation unit 506, which is further connected to the conjugation unit 508. The first multiplication unit 505 is further connected to the third summation unit 507. The third summation unit 507 is connected to the third multiplication unit 509, which also is connected with the conjugation unit 508 and the fourth multiplication unit 510. The fourth multiplication unit 510 is further connected to the output 511.

A signal, entering at the input 500, is directed through the detector 312 along the path as indicated by the depicted arrows, and is processed by the processing units 501-510 on its path. To summarise its function: in the detector 312, a complex signal, entering at input 500, (i.e. the I (in-phase) component and the Q (quadrature) component of a received signal obtained in the converters in the analog-digital conversion blocks 307) is supplied to two IIR (Infinite Impulse Response) filters with biquad structure. The signals in the two respective IIR filters are multiplied with each other to produce only the imaginary component (at the third multiplication unit 509) which is used for integration (or summation) after sign inversion of the odd numbered samples (at the fourth multiplication unit 510).

Such an integration result can be used for symbol timing tracking because of the phase alterations of the CCK signal which occur every 91 ns (at 11 MHz chip rate).

With the chip rate of 11 MHz as defined by IEEE 802.11 extension 11b and a chosen sampling rate of 22 MHz, a chip duration entails two sampling intervals. The modulation defined in IEEE 802.11 extension 11b at 5.5 MHz and 11 MHz is based on assigning 16 and 256 CCK patterns out of $4^8$ possible patterns per symbol interval of 8 chips with 4 possible phases between the I and Q component of a received signal.

However, due to the random-like phase jumps once per chip interval, the received signal appears as a QPSK signal at 11 MHz. The ratio of 2:1 between sampling rate and chip rate provide a simple way of digital signal processing with IIR filter coefficients of 0, +1, −1, +i, and −i. When using another ratio different from 2:1, the processing would require a more complex IIR filtering approach with complex-valued multipliers other than 0, +1, −1, +i, and −i, and would include a higher computational load of the DSP 303.

Furthermore, to distinguish between noise and QPSK signals, the DSP 303 compares the phase of the received signal after every 22 samples. The difference of the absolute phase is integrated over the whole integration period, except for an initial blank time (due to the finite response time of the IIR filters). In case of QPSK signals, a strong phase correlation is found, which is absent for noise.

In this embodiment of the present invention a reliable detection of CCK (payload) signals can be achieved by combining the signal level information, the low bit rate carrier detection, both known from the prior art, and the high bit rate carrier detection by carrier sensing detector 312 using the phase correlation between sampled QPSK signals.

In wireless LANs according to IEEE 802.11 extension 11*a* that use the 5 GHz band with OFDM modulation, a carrier detector in a wireless LAN device (network station or access point), is capable of sensing both preamble and payload transmissions in a similar way as for a wireless LAN as defined by IEEE 802.11 extension 11*b*. In this second preferred embodiment of the present invention, carrier sensing is also performed on signal level, preamble transmission, and payload transmission. During signal level sensing, the signal level of a received signal is determined. The detection of a preamble transmission involves a signal synchronisation and training procedure, as known from prior art.

However, due to the different modulation methods QPSK and OFDM in the frequency bands of 2.4 GHz and 5 GHz, respectively, in this second preferred embodiment of the present invention, the payload carrier detection can not be performed as disclosed for the first embodiment. In a payload data frame transmitted as a OFDM modulated signal, the payload symbol is encoded by cyclic extension in order to enhance the robustness of transmissions: within a payload symbol interval of 4 μs, a first signal transmitted during the first 800 ns of the interval, is repeated by a second identical signal during the last 800 ns of the interval. Therefore, in this second embodiment the payload detection is based on the cyclic extension of symbols, and the auto-correlation of the first signal with the second identical signal with the symbol interval.

Figure 6:
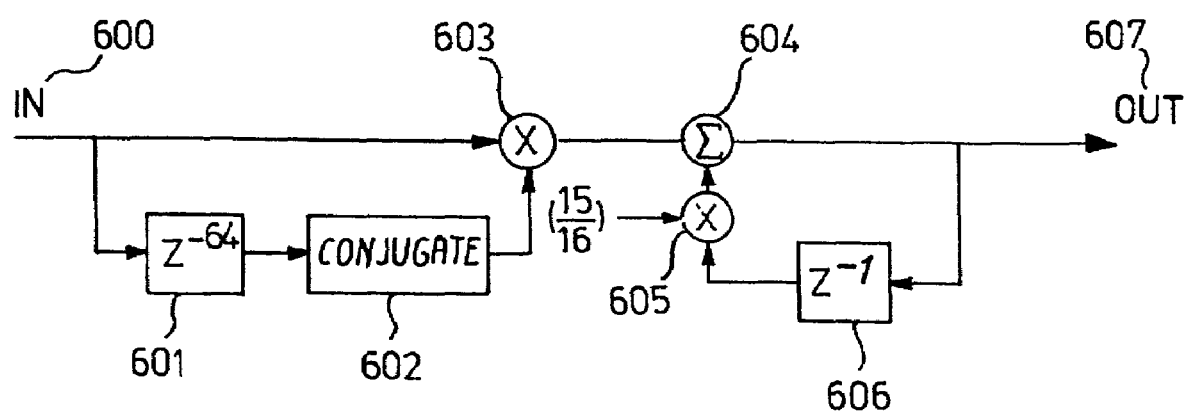
FIG. 6 shows schematically an implementation of a carrier sensing detector for high bit rate payload transmission detection in the 5 GHz band, according to the present invention.

Similar to FIG. 5 for the high rate carrier detection in the 2.4 GHz band, FIG. 6 shows a schematic implementation of a carrier sensing detector 312 for high rate payload transmission according to the embodiment of the present invention for the 5 GHz band.

The detector 312 comprises an input 600, an output 607, a summation unit 604, signal delay units 601, 606, multiplication units 603, 605, and a conjugation unit 602. In the detector 312, the input 600 is connected to the first multiplication unit 603, which is connects to the summation unit 604 and the conjugation unit 602. The input 600 is also connected through a second line with the first signal delay unit 601. The first signal delay unit 601 connects to the conjugation unit 602. The first multiplication unit 603 further connects to the summation unit 604, which connects to the second multiplication unit 605 and the output 607. The second multiplication unit 605 is also connected with the second signal delay unit 606, which also connects to the output 607.

A signal, entering input 600, is directed through detector 312 along the path as indicated by the depicted arrows, and is processed by the processing units 601-606 on its path. To summarise its function: in detector 312 a complex signal entering at input 600, (i.e. the I (in-phase) component and the Q (quadrature) component of a received signal obtained in the converters in the analog-digital conversion blocks 307) is multiplied with the complex conjugate of its 3.2 μs delayed version (at the first multiplication unit 603, which gets at an interval sampling rate of 20 MHz the conjugate of the 64 samples delayed version of the received signal in question), the real-valued signal from this multiplication is averaged by a leaky integrator (comprising the summation unit 604, the second multiplication unit 605 and the second signal delay unit 606) to determine an average value of the correlation between the input signal and its 3.2 μs delayed version for the last period (of 16 samples, which, at a sampling rate of 20 MHz, cover an 800 ns interval).

The leaky integrator provides a time-based output signal in which auto-correlation peaks with a period of 4 μs are present. By means of these periodic peaks the payload detector 312 determines whether a payload transmission is in progress or not. (In case a signal without cyclic extension is received, no auto-correlation peaks will be present, which indicates the absence of a payload transmission.)

By observing the signal level information, the low bit rate preamble carrier detection, as well as the high bit rate payload carrier detection, a more reliable carrier sense detection of OFDM (payload) signals can be achieved.

The invention claimed is:

1. A system for accessing a wireless network from a wireless station, comprising:
   a memory that stores computer-readable code; and
   a processor operatively coupled to said memory, said processor configured to implement said computer-readable code, said computer-readable code configured to:
   detect a first signal portion in a received data signal;
   detect a second signal portion in said received data signal, wherein said second signal portion follows said first signal portion, and said second signal portion utilizes a second signal coding technique different from a first signal coding technique utilized by said first signal portion, wherein said step of detecting a second signal portion in said received data signal further comprises the step of determining an auto-correlation between a first part of said second signal portion and a third part of said second signal portion; and
   utilize said determination of an auto-correlation to perform network access control.

2. A method for accessing a wireless network from a wireless station, comprising the steps of:
   detecting a first signal portion in a received data signal;
   detecting a second signal portion in said received data signal, wherein said second signal portion follows said fist signal portion, and said second signal portion utilizes a second signal coding technique different from a first signal coding technique utilized by said first signal portion, wherein said step of detecting a second signal portion in said received data signal further comprises the step of determining an auto-correlation between a first part of said second signal portion and a third part of said second signal portion; and
   utilizing said determination of art auto-correlation to perform network access control.

3. The method according to claim 2, wherein said first signal portion comprises OFDM as said first signal coding technique of said first signal portion and said second signal portion comprises OFDM as said second signal coding technique of said second signal portion.

4. The method according to claim 2, wherein said first signal portion comprises BPSK, QPSK or other PSK as said first signal coding technique of said first signal portion and said second signal portion comprises CCK, QAM or PSK as said second signal coding technique of said second signal portion.

5. The system according to claim 1, wherein said processor is further configured to filter the second signal portion with a complex-valued processing filter of two IIR filters with biquad structure, capable of sampling said second signal portion at a sampling frequency which is twice the frequency of said second signal portion.

6. The system according to claim 1, wherein said first signal portion comprises OFDM as said first signal coding technique of said first signal portion and said second signal portion comprises OFDM as said second signal coding technique of said second signal portion.

7. The method according to claim 1, wherein said first signal portion comprises BPSK, QPSK or other PSK as said first signal coding technique of said first signal portion and said second signal portion comprises CCK, QAM or PSK as said second signal coding technique of said second signal portion.

8. The method according to claim 2, wherein the step of detecting the second signal portion further comprises filtering the second signal portion with a complex-valued processing filter of two IIR filters with biquad structure, capable of sampling said second signal portion at a sampling frequency which is twice the frequency of said second signal portion.

* * * * *

UNITED STATES PATENT AND TRADEMARK OFFICE
CERTIFICATE OF CORRECTION

| | | |
|---|---|---|
| PATENT NO. | : 7,463,589 B2 | Page 1 of 1 |
| APPLICATION NO. | : 09/919051 | |
| DATED | : December 9, 2008 | |
| INVENTOR(S) | : Wilhelmus Diepstraten | |

It is certified that error appears in the above-identified patent and that said Letters Patent is hereby corrected as shown below:

In claim 2, column 10, line 50, "fist" should be replaced by -- first --.

In claim 2, column 19, line 58, "art" should be replaced by -- an --.

Signed and Sealed this
Twenty-fifth Day of December, 2012

David J. Kappos
*Director of the United States Patent and Trademark Office*